(12) United States Patent
Yoo et al.

(10) Patent No.: US 10,862,649 B2
(45) Date of Patent: Dec. 8, 2020

(54) METHOD AND APPARATUS FOR ALLOCATING PTRS IN WIRELESS COMMUNICATION SYSTEM

(71) Applicant: Samsung Electronics Co., Ltd., Suwon-si (KR)

(72) Inventors: Hyunil Yoo, Suwon-si (KR); Hyungju Nam, Gwangmyeong-si (KR); Jaewon Kim, Seoul (KR); Jeehwan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/037,427

(22) Filed: Jul. 17, 2018

(65) Prior Publication Data

US 2019/0052433 A1    Feb. 14, 2019

(30) Foreign Application Priority Data

Aug. 10, 2017    (KR) .................. 10-2017-0101920

(51) Int. Cl.
*H04W 76/27* (2018.01)
*H04L 5/00* (2006.01)
*H04W 72/04* (2009.01)
*H04L 27/26* (2006.01)

(52) U.S. Cl.
CPC .......... *H04L 5/0053* (2013.01); *H04L 5/0023* (2013.01); *H04L 5/0048* (2013.01); *H04L 5/0082* (2013.01); *H04L 5/0091* (2013.01); *H04W 72/0453* (2013.01); *H04W 76/27* (2018.02); *H04L 5/0035* (2013.01); *H04L 27/2613* (2013.01); *H04L 27/2657* (2013.01)

(58) Field of Classification Search
None
See application file for complete search history.

(56) References Cited

U.S. PATENT DOCUMENTS

2019/0165910 A1*    5/2019    Lee .................. H04L 5/0048

FOREIGN PATENT DOCUMENTS

WO    2016/000915 A1    1/2016

OTHER PUBLICATIONS

National Instruments, 'Discussion on explicit and implicit signaling for PT-RS', R1-1708272, 3GPP TSG RAN WG1 Meeting #89, Hangzhou, P.R. China, May 5, 2017.

(Continued)

*Primary Examiner* — Kodzovi Acolatse
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for internet of things (IoT) is provided. The communication method includes applying to intelligent services based on the 5G communication technology and the IoT-related technology, such as smart home, smart building, smart city, smart car, connected car, health care, digital education, smart retail, security and safety services. The disclosure relates to a method and an apparatus for allocating a phase tracking reference signal (PTRS) for estimating and compensating for phase distortion due to phase noise, Doppler effect, or synchronization error.

20 Claims, 14 Drawing Sheets

(56) References Cited

OTHER PUBLICATIONS

ZTE, 'Discussion on RS for phase tracking', R1-1707132, 3GPP TSG RAN WG1 Meeting #89, Hangzhou, China, May 7, 2017.
Panasonic, 'PT-RS design', R1-1710359, 3GPP TSG RAN WG1 Meeting NR Ad-Hoc #2, Qingdao, China, Jun. 16, 2017.
Ericsson, 'Summary of PTRS open issues and companies views', R1-1707803, 3GPP TSG-RAN WG1 Meeting #89, Hangzhou, China, May 17, 2017.
International Search Report dated Oct. 19, 2018, issued in International Application No. PCT/KR2018/008036.

* cited by examiner

METHOD AND APPARATUS FOR ALLOCATING PTRS IN WIRELESS COMMUNICATION SYSTEM

CROSS-REFERENCE TO RELATED APPLICATION(S)

This application is based on and claims priority under 35 U.S.C. § 119 of a Korean patent application number 10-2017-0101920, filed on Aug. 10, 2017, in the Korean Intellectual Property Office, the disclosure of which is incorporated by reference herein in its.

BACKGROUND

1. Field

The disclosure relates to a method and an apparatus for allocating a phase tracking reference signal (PTRS) for estimating and compensating for phase distortion due to phase noise, Doppler effect, or synchronization error.

2. Description of the Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "Beyond 4G Network" or a "Post long term evolution (LTE) System". The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as sensing technology, wired/wireless communication and network infrastructure, service interface technology, and Security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

On the other hand, in an orthogonal frequency-division multiplexing (OFDM) based wireless communication system, it is required to estimate and compensate for a common phase error (CPE) that commonly exerts an influence on all OFDM subcarriers using a reference signal in a frequency domain in order to estimate the phase error. Further, it is possible to reduce the influence of an inter-carrier interference (ICI) by estimating and compensating for the phase error in the unit of a symbol using a cyclic prefix (CP) in a time domain.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for allocating a PTRS for estimating a phase error.

Additional aspects will be set forth in part in the description which follows and, in part, will be apparent from the description, or may be learned by practice of the presented embodiments.

In accordance with an aspect of the disclosure, a method for a terminal is provided. The method includes receiving from a base station information on a resource location of a phase tracking reference signal (PTRS), receiving the PTRS at a location on a frequency axis identified based on the information on the resource location, and performing phase tracking using the PTRS.

The location on the frequency axis on which the PTRS is transmitted may be determined based on a virtual resource block (VRB) index, and the PTRS may be allocated at a predetermined interval on the VRB index.

A port of the PTRS may correspond to any one of a plurality of demodulation reference signal (DMRS) ports, and the DMRS port to which the PTRS port is mapped may be indicated by the information on the resource location.

The information on the resource location may be information indicating an offset of a resource element (RE) to which the PTRS is mapped.

The information on the resource location may be received through radio resource control (RRC) signaling.

In accordance with an aspect of the disclosure, a terminal is provided. The terminal includes a transceiver configured to transmit/receive signals, and at least one processor configured to receive from a base station information on a resource location of a PTRS, receive the PTRS at a location on a frequency axis identified based on the information on the resource location, and perform phase tracking using the PTRS.

In accordance with an aspect of the disclosure, a method for a base station is provided. The method includes determining a resource location of a PTRS to be transmitted to a terminal, transmitting information on the resource location to the terminal, and transmitting to the terminal the PTRS for performing phase tracking at a location on a frequency axis identified based on the information on the resource location.

In accordance with an aspect of the disclosure, a base station is provided. The base station includes a transceiver configured to transmit/receive signals, and at least one processor configured to determine a resource location of a PTRS to be transmitted to a terminal, transmit information on the resource location to the terminal, and transmit to the terminal the PTRS for performing phase tracking at a location on a frequency axis identified based on the information on the resource location.

The PTRS has the characteristics that the number of PTRS ports should be equal to the number of oscillators at a transmitting end in case of a single user multiple-input multiple-output (SU-MIMO), should be equal to the number of UEs in case of a multi user MIMO (MU-MIMO), and should be smaller than the number of DMRS ports. According to the aspects of the disclosure, it is possible to provide a method capable of efficiently allocating the PTRS in consideration of the characteristics of the PTRS as described above.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
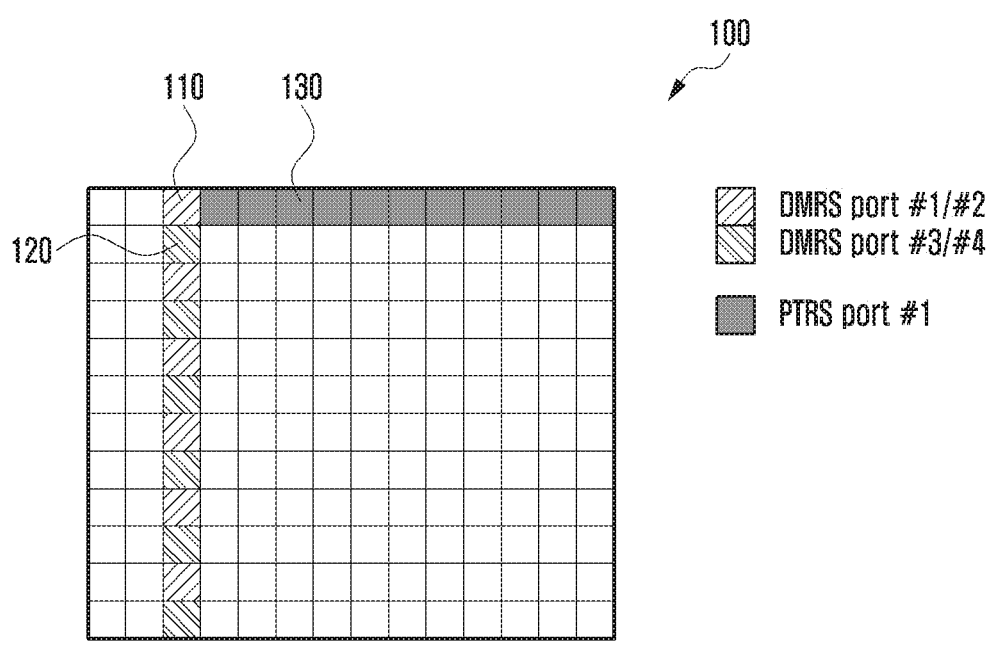
FIG. 1 is a diagram illustrating an association between one demodulation reference signal (DMRS) port and a phase tracking reference signal (PTRS) port in a DMRS group according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure.

The terms and words used in the following description and claims are not limited to the bibliographical meanings but, are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

FIG. 1 is a diagram illustrating an association between one demodulation reference signal (DMRS) port and a phase tracking reference signal (PTRS) port in a DMRS group according to an embodiment of the disclosure.

Referring FIG. 1, a PTRS is a pilot signal for estimating and compensating for phase distortion due to phase noise, Doppler effect, or synchronization error. The PTRS for estimating the phase distortion has the following features.

1. In case of single user multiple-input multiple-output (SU-MIMO), the number of PTRS ports is equal to the number of oscillators of a transmitting end.

2. In case of multi user MIMO (MU-MIMO), the number of PTRS ports should be equal to the number of UEs.

3. Since inter-symbol phase distortion in a slot is estimated based on a channel estimated using a DMRS, it is necessary that the number of PTRS ports is smaller than the number of DMRS ports.

Summing up the above-described features, association between one DMRS port for each DMRS group and a PTRS is required, and such a result is illustrated in FIG. 1. FIG. 1 illustrates an example 100 in which one PTRS port #1 130 is associated with respect to DMRS antenna port #1 and #2 110 belonging to the DMRS group and antenna port #3 and #4 120.

In FIG. 1, as an example, it is assumed that all DMRS port #1, #2, #3, and #4 constitute the same DMRS port group. Since four DMRS ports constitute the same DMRS port group in all, it may be assumed that four DMRS ports share one oscillator and correspond to the first feature of the PTRS as described above, so that the number of PTRS ports is one. What DMRS port location one PTRS port should be mapped to is described below.

The DMRS may have two types of configurations, and the DMRS illustrated in FIG. 1 corresponds to an embodiment of the two types of configurations. The DMRS illustrated in FIG. 1 shows the DMRS configuration in which only one symbol is used as the DMRS, and 4 ports can be allocated at maximum. DMRS configuration type 2 supports up to 12 DMRS ports at maximum.

In FIG. 1, four DMRS ports can be supported through comb type 2 and cyclic shift-2. FIG. 1 shows one embodiment in which four DMRS ports are supported, and illustrates that DMRS port #1 and #2 110 are supported through the cyclic shift in the first comb type, and DMRS port #3 and #4 120 are supported through the cyclic shift in the second comb type. In FIG. 1, although the DMRS ports can be discriminated through the cyclic shift, the PTRS ports should be discriminated only through frequency division. In this case, two types of PTRS port mapping or association may be considered as follows.

The k-th subcarrier index to which the PTRS of the p-th port in the first symbol is allocated as in Equation 1 below.

$$a_{k,l}^{(p)} = \qquad \text{Equation 1}$$
$$k = k_{DM-RS,p}$$

In Equation 1, $k_{DM-RS,p}$ indicates a subcarrier index to which the p-th DMRS port is allocated.

In Equation 1, the first method for association between the PTRS and the DMRS port is a method for mapping the PTRS to the smallest DMRS port number in the DMRS group. $k_{DM-RS,p}$ becomes the DMRS location of the smallest port number. In case of allocating the PTRS as described above, the PTRS in the form as illustrated in FIG. 1 can be allocated, and additional signaling is not necessary.

The second method for association between the PTRS and the DMRS port is a method for association between the PTRS and the DMRS port through signaling. Through downlink control information (DCI), medium access control control element (MAC CE), or radio resource control (RRC) signaling, a base station can transfer association information between the PTRS port and the DMRS port to a terminal. The second method is a method for the base station to notify the terminal of the signaling corresponding to $k_{DM-RS,p}$ through the DCI, MAC CE, or RRC. Through such explicit signaling, the terminal can perform PTRS mapping as shown in FIG. 2 even in case of SU-MIMO.

Figure 2:
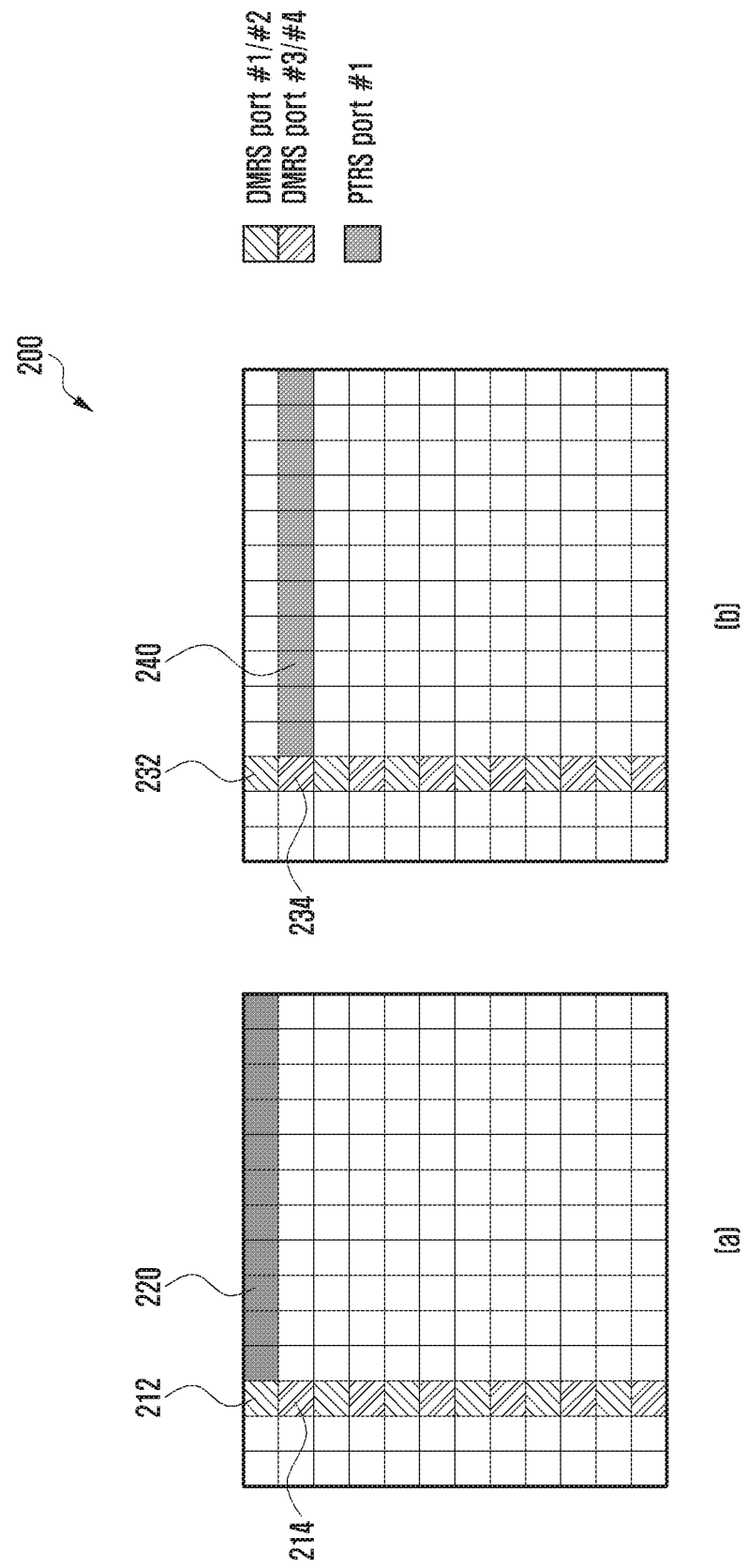
FIG. 2 is a diagram explaining a method for association between a PTRS and a DMRS port through signaling according to an embodiment of the disclosure.

FIG. 2 is a diagram (200) explaining a method for association between a PTRS and a DMRS port through signaling according to an embodiment of the disclosure.

Referring to FIG. 2, it is possible to allocate a PTRS to a location of comb type 1 (212, 232, 220) or comb type 2 (214, 234, 240) through signaling. However, as shown in FIG. 2, if it is assumed that four DMRS ports belong to four different DMRS port groups, there occurs a problem that the PTRS locations should overlap each other like the DMRS locations. As described above, the ports of the PTRS should be orthogonal to each other, and the ports are discriminated by frequency indexes. Accordingly, the PTRS ports can be extended as follows.

Figure 3:
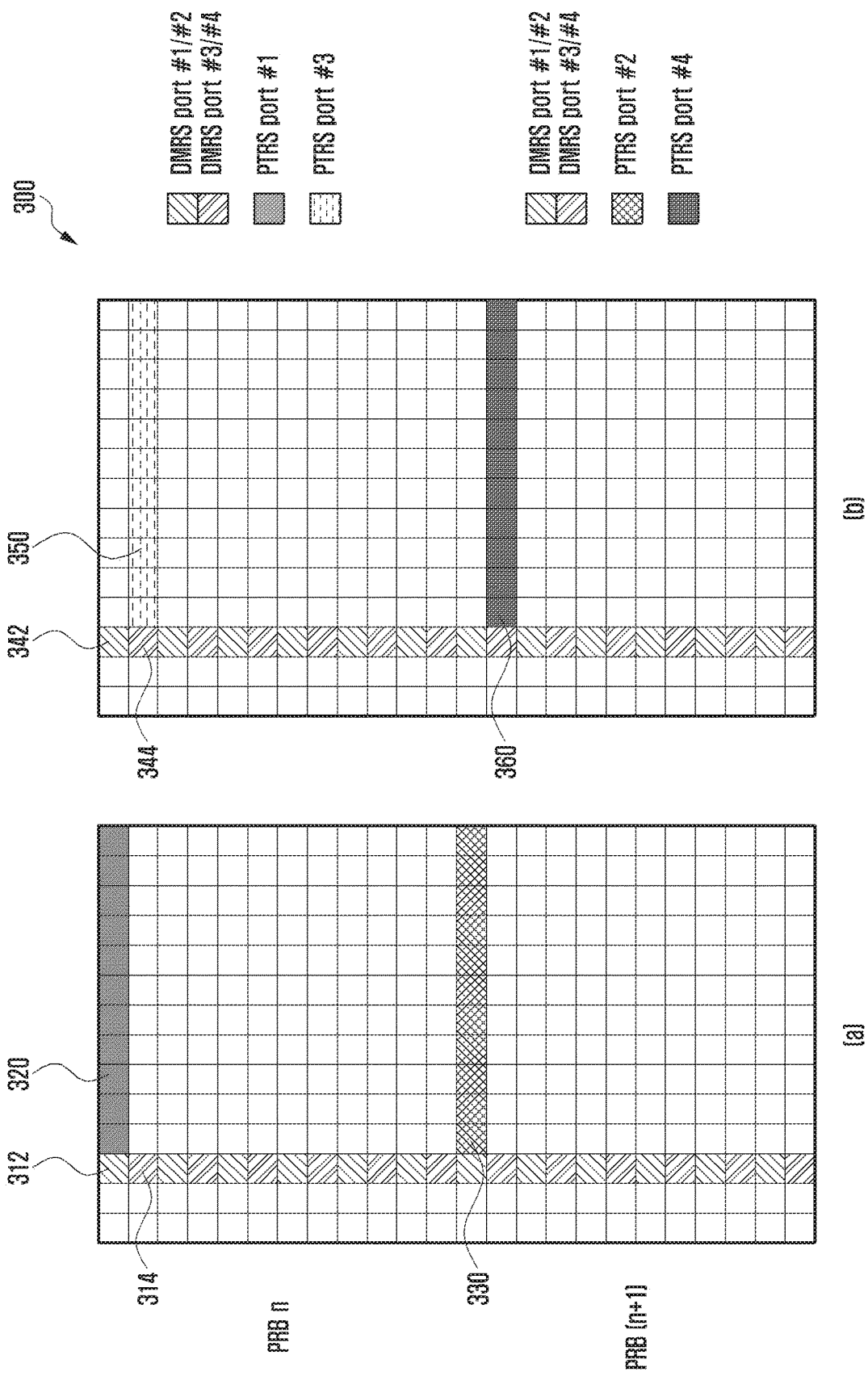
FIG. 3 is a diagram explaining a first method for allocating a PTRS in consideration of a plurality of PTRS ports according to an embodiment of the disclosure.

The number of PTRS ports in one RB is equal to the number of resource elements (REs) occupied by the DMRS ports, and extension of the PTRS ports is allocated through the next RB (or extended PTRS ports are allocate through the next RB). The extended PTRS ports can be allocated as illustrated in FIG. 3.

$$a_{k,l}^{(p)} = \qquad \text{Equation 2}$$
$$k = k_{DM-RS,p} + 12 \cdot \alpha,$$
$$\alpha = \begin{cases} 0 & \text{if } DMRS \text{ port mod } 2 = 1 \\ K & \text{if otherwises, where } K \in (1, \ldots, 14) \end{cases}$$

Equation 2 is an embodiment of the extended PTRS ports, in which the PTRS associated with the even-numbered DMRS port is allocated to the n-th physical resource block (PRB), and the even-numbered PTRS port is allocated to the (n+1)-th PRB (or the PTRS associated with the odd-numbered DMRS port is allocated to the (n+1)-th PRB).

Equation 2 represents a case where a plurality of PTRS ports are allocated to over several RBs, different classification methods may be applied to the even/odd-numbered PTRS ports.

FIG. 3 illustrates an embodiment in which PTRS port #1 320 is associated with DMRS port #1 and #2 312 and is mapped to PRB n and an embodiment in which PTRS port #2 330 is mapped to PRB n+1 according to an embodiment of the disclosure (a). FIG. 3 also illustrates an embodiment in which PTRS port #3 350 is associated with DMRS port #3 and #4 344 and is mapped to PRB n and an embodiment in which PTRS port #4 360 is mapped to PRB n+1 according to an embodiment of the disclosure (b).

Referring to FIG. 3, in DMRS configuration 1, the number of different frequency resources occupied by different DMRS ports is 2 due to DMRS allocation in accordance with comb 2. Accordingly, in PRB index (n), the number of PTRS ports is limited to 2, and port 3 and 4 may be mapped to PRB index (n+a), where a=1, 2, 3, 4, . . . , K. K may be extended up to 14. The value of K may be configured by the base station through DCI/MAC CE/RRC, and a fixed value (e.g., K=1) may be always used to reduce additional signaling overhead.

Further, a plurality of PTRS ports may be all allocated in one RB. The number of PTRS ports in one RB is equal to the number of REs occupied by the DMRS ports, and extension of the PTRS ports is allocated through the next RB.

Figure 4:
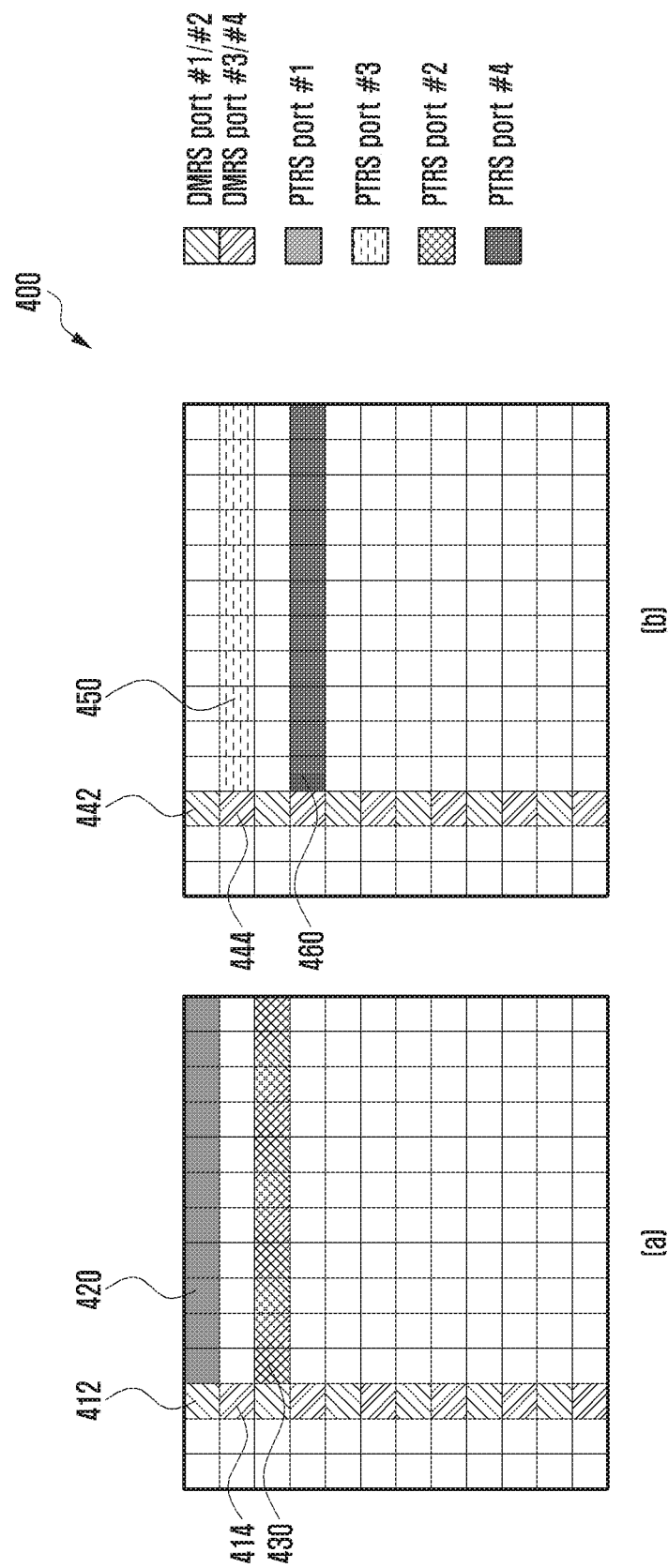
FIG. 4 is a diagram explaining a second method for allocating a PTRS in consideration of a plurality of PTRS ports according to an embodiment of the disclosure.

FIG. 4 illustrates a method for configuring a DMRS mapping group in one RB and allocating PTRS ports corresponding to DMRS ports in different DMRS mapping groups according to an embodiment of the disclosure (400).

Referring to FIG. 4, an embodiment in which PTRS port #1 420 and PTRS port #2 430 are mapped to DMRS port #1 and #2 412 in the same RB is shown (a). Referring to FIG. 4, an embodiment in which PTRS port #3 450 and PTRS port #4 460 are mapped to DMRS port #3 and #4 444 in the same RB is shown (b).

The DMRS port group means that several DMRS ports form a group. Since the PTRS port is mapped to one DMRS port in such a DMRS port group, the base station should notify the terminal of DMRS port group information. The DMRS port group information may be transferred to the terminal through RRC/MAC CE or DCI.

Figure 5:
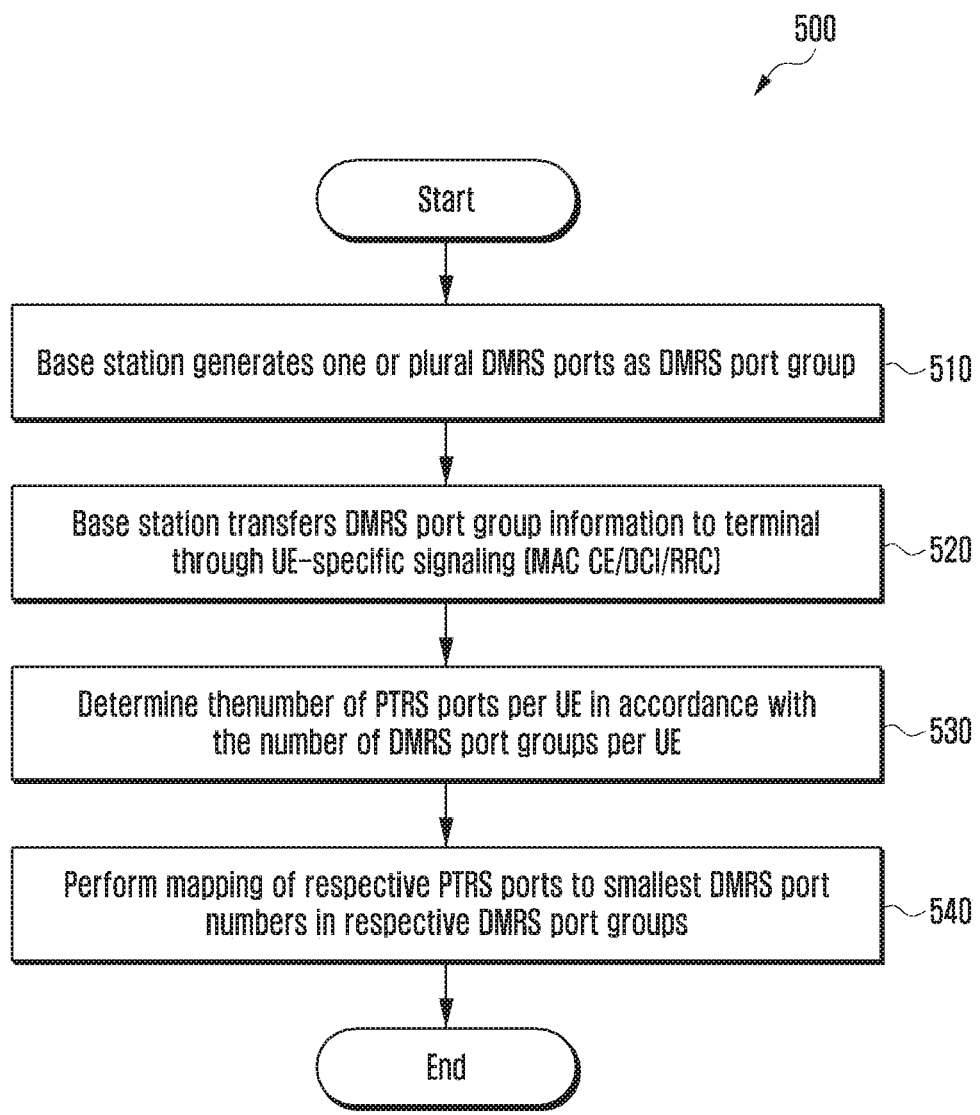
FIG. 5 is a flowchart explaining an operation of a base station to perform mapping between a PTRS port and a DMRS port in each DMRS port group according to an embodiment of the disclosure.
Figure 6:
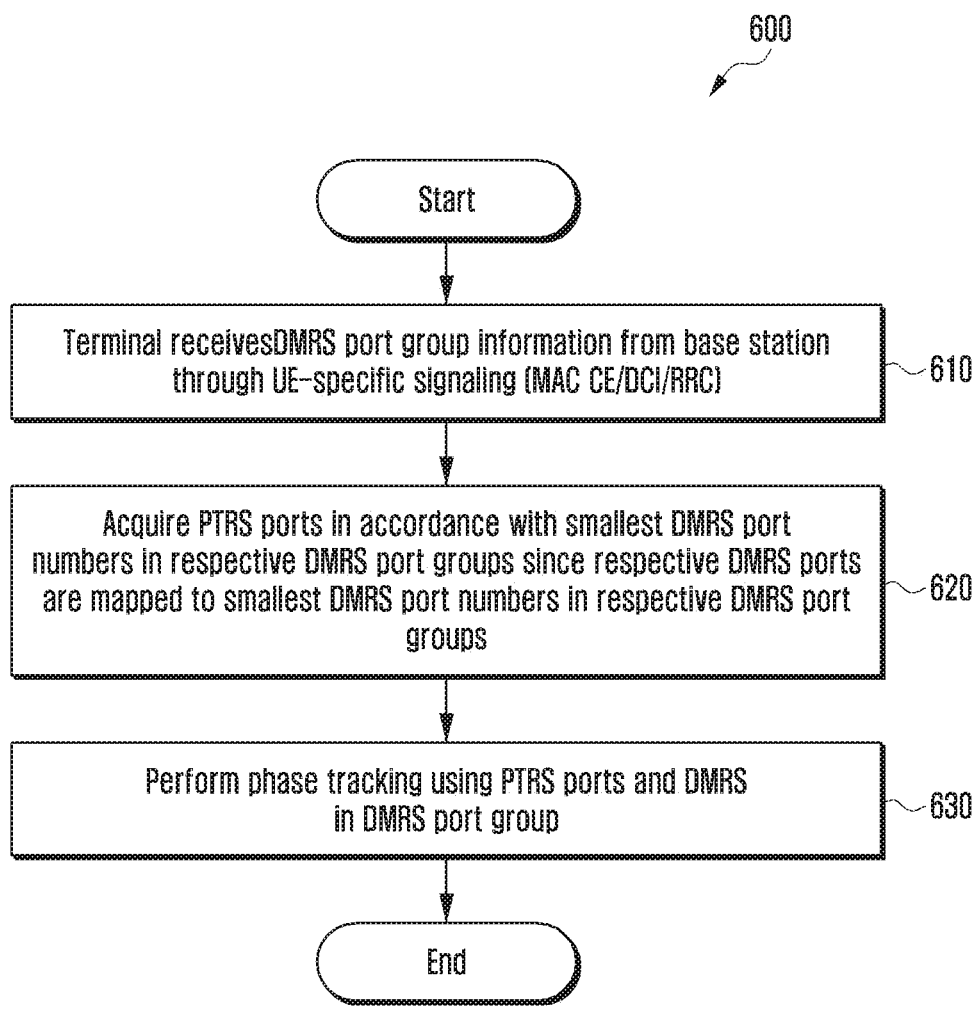
FIG. 6 is a flowchart explaining an operation of a terminal to perform mapping between a PTRS port and a DMRS port in each DMRS port group according to an embodiment of the disclosure.

FIGS. 5 and 6 are diagrams (500, 600) explaining the operations of a base station and a terminal for mapping between a PTRS and a DMRS port in a DMRS port group as described above according to an embodiment of the disclosure.

Referring to FIG. 5, if the DMRS port group is formed at operation 510 the base station may transfer information on the DMRS port group to the terminal through UE-specific signaling (e.g., MAC CE, DCI, or RRC) at operation 520. Then, the base station may determine the number of PTRS ports for each UE in accordance with the number of DMRS port groups for each UE at operation 530, and may map the PTRS port to the smallest DMRS port number in each DMRS port group at operation 540. The base station may transmit the PTRS to the terminal in accordance with the result of mapping.

Referring to FIG. 6, if the DMRS port group information is acquired from the base station at operation 610 the terminal may assume that the PTRS is mapped to the smallest DMRS port number in each DMRS port group, and may acquire the PTRS port in accordance with the smallest DMRS port number in each DMRS port group at operation 620. Then, the terminal may perform phase estimation and compensation using the DMRS port in the PTRS port group at operation 630.

Next, a method for generating a PTRS will be described. The PTRS may be UE-specific, but may be generated based on cell-ID/virtual cell ID (VCID) of the base station. Since the PTRS can be UE-specifically generated and allocated, a sequence for generating the PTRS may be generated through allocation of the UE-specific ID. The cell-specific ID or UE-specific ID for generating the PTRS may be transferred to the terminal through RRC. Further, the ID for generating the sequence for generating the PTRS may be generated through addition of a PRB index allocated with the PTRS to the ID transferred to the DCI/MAC CE/RRC.

Figure 7:
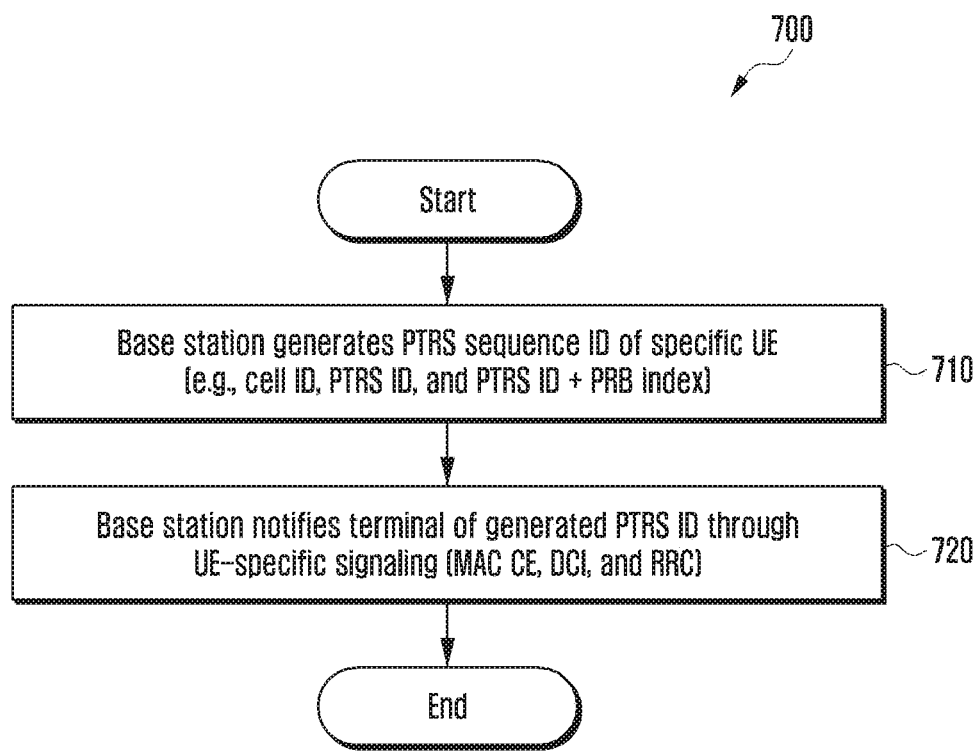
FIG. 7 is a flowchart explaining an operation of a base station to give a PTRS sequence ID according to an embodiment of the disclosure.
Figure 8:
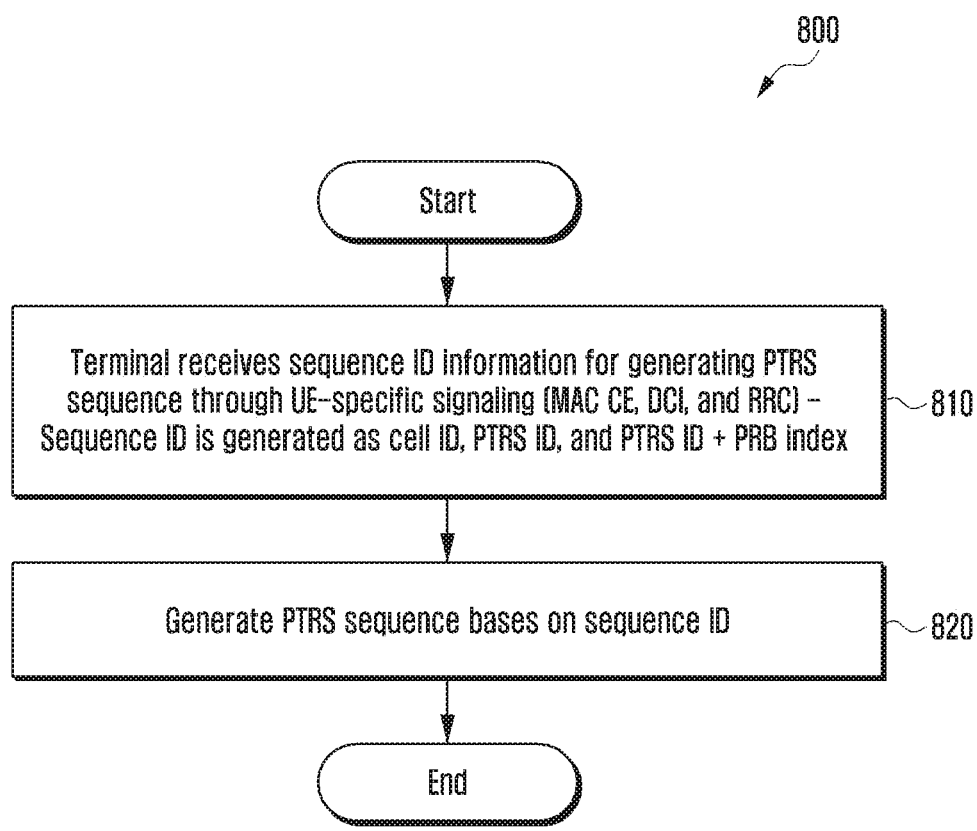
FIG. 8 is a flowchart explaining an operation of a terminal to give a PTRS sequence ID according to an embodiment of the disclosure.

FIGS. 7 and 8 are diagrams (700, 800) explaining the operations of a base station and a terminal for giving a UE-specific ID of PTRS according to an embodiment of the disclosure.

Referring to FIGS. 7 and 8, if the PTRS sequence ID is UE-specifically allocated, the following advantages can be obtained. In a system using beamforming, the base station may perform discrimination between UEs through spatial multiplexing using the beamforming, and in this case, even if the same PTRS port is allocated between UEs, the sequences thereof may be differently operated. If the sequence ID is differently allocated, the PTRS is also generated as another seed, and the sequences between UEs can be discriminated even if the spatial multiplexing (SM) using the beamforming is not ideal.

Referring to FIG. 7, the base station may generate a PTRS sequence ID of a specific UE at operation 710 and may notify the terminal of the generated PTRS ID through UE-specific signaling at operation 720. Referring to FIG. 8, the terminal may receive sequence ID information for generating a PTRS sequence from the base station at operation 810, and may generate the PTRS sequence based on the received sequence ID at operation 820.

Figure 9:
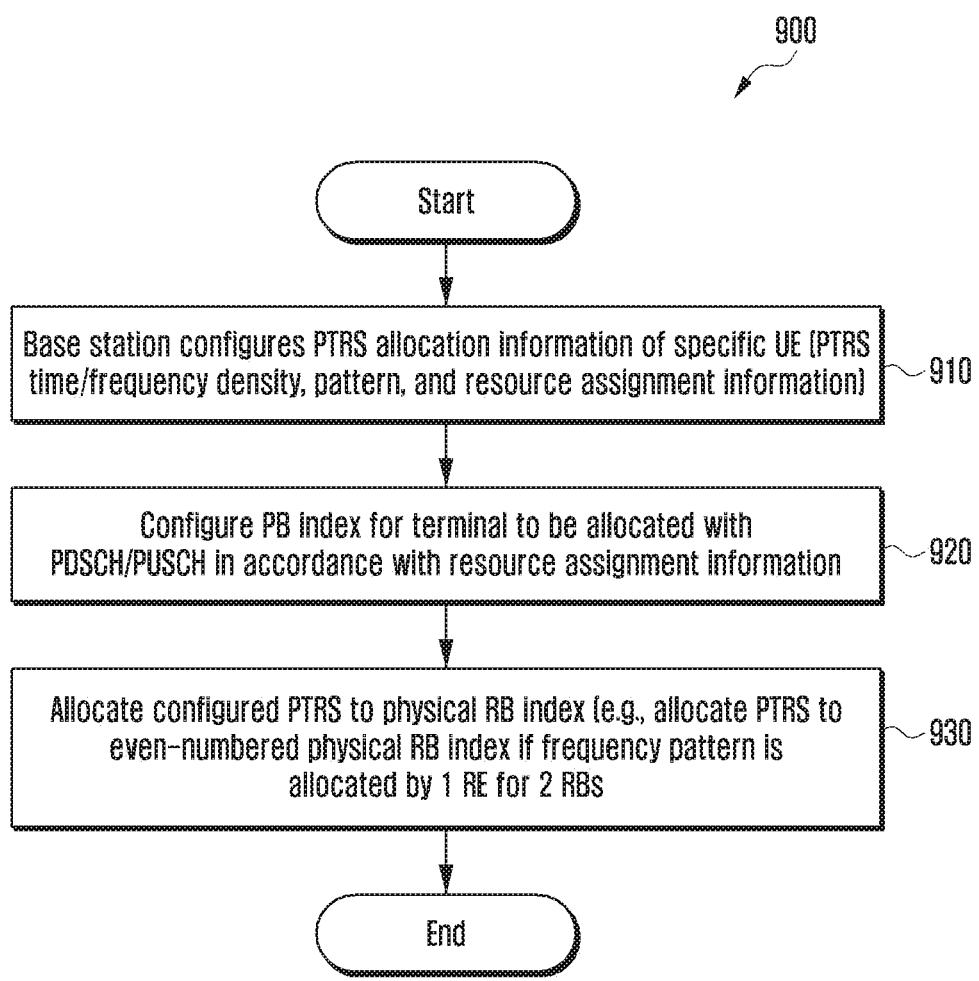
FIG. 9 is a flowchart explaining an operation of a base station to perform PTRS mapping using a physical resource block (RB) index according to an embodiment of the disclosure.
Figure 10:
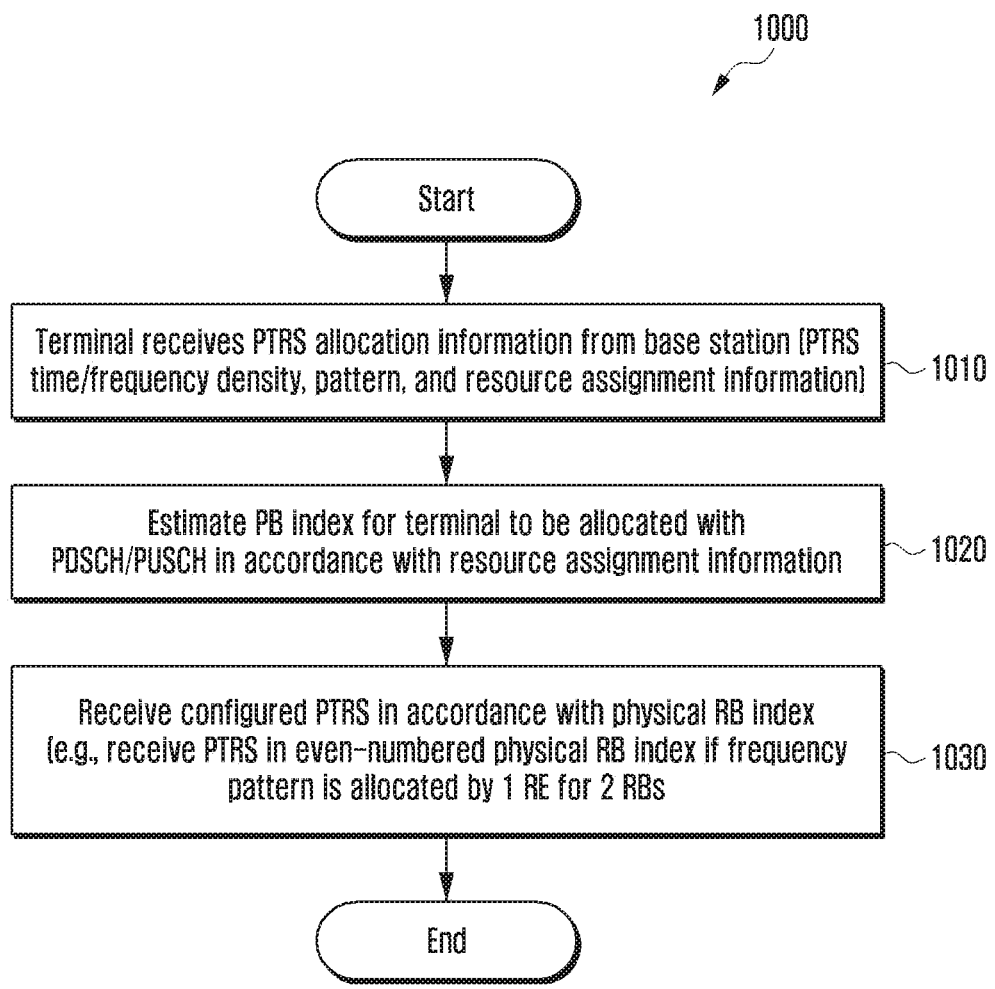
FIG. 10 is a flowchart explaining an operation of a terminal to perform PTRS mapping using a physical RB index according to an embodiment of the disclosure.
Figure 11:
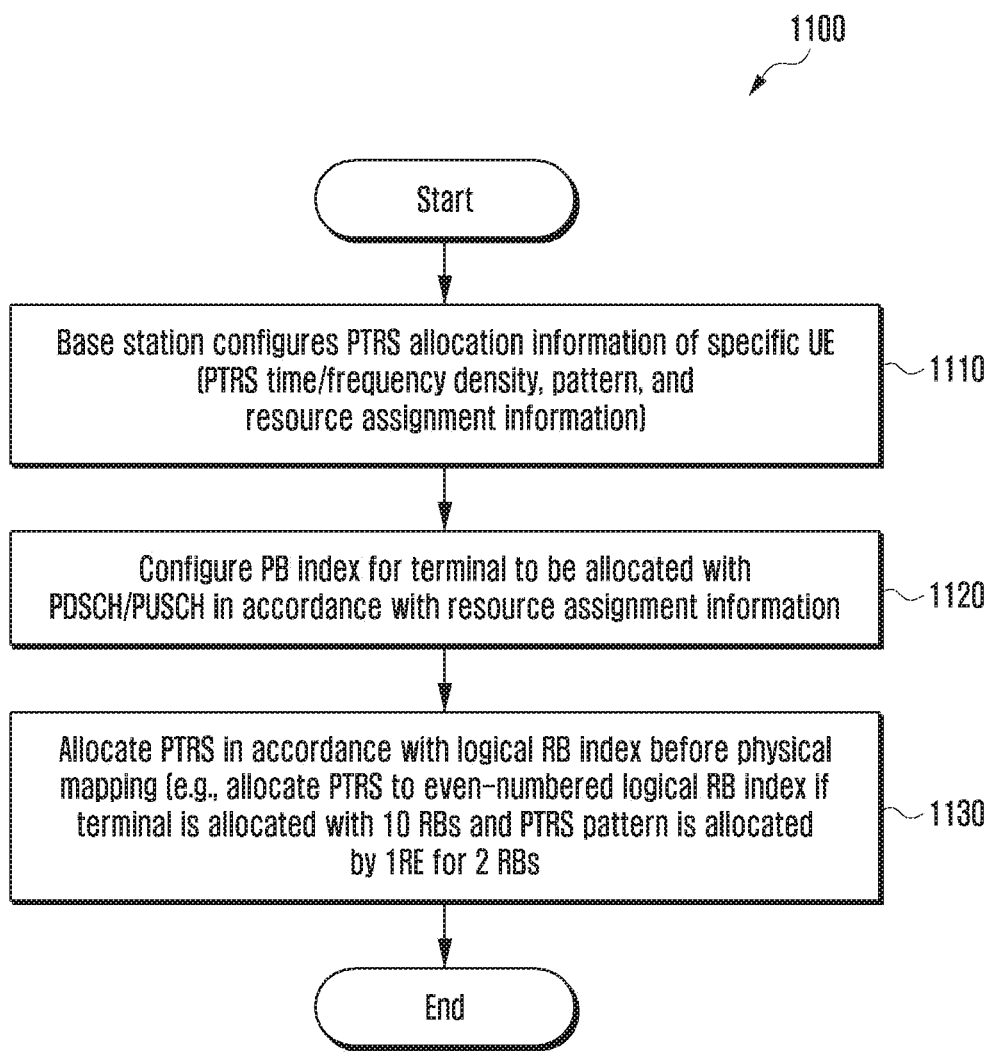
FIG. 11 is a flowchart explaining an operation of a base station to perform PTRS mapping using a logical RB index according to an embodiment of the disclosure.
Figure 12:
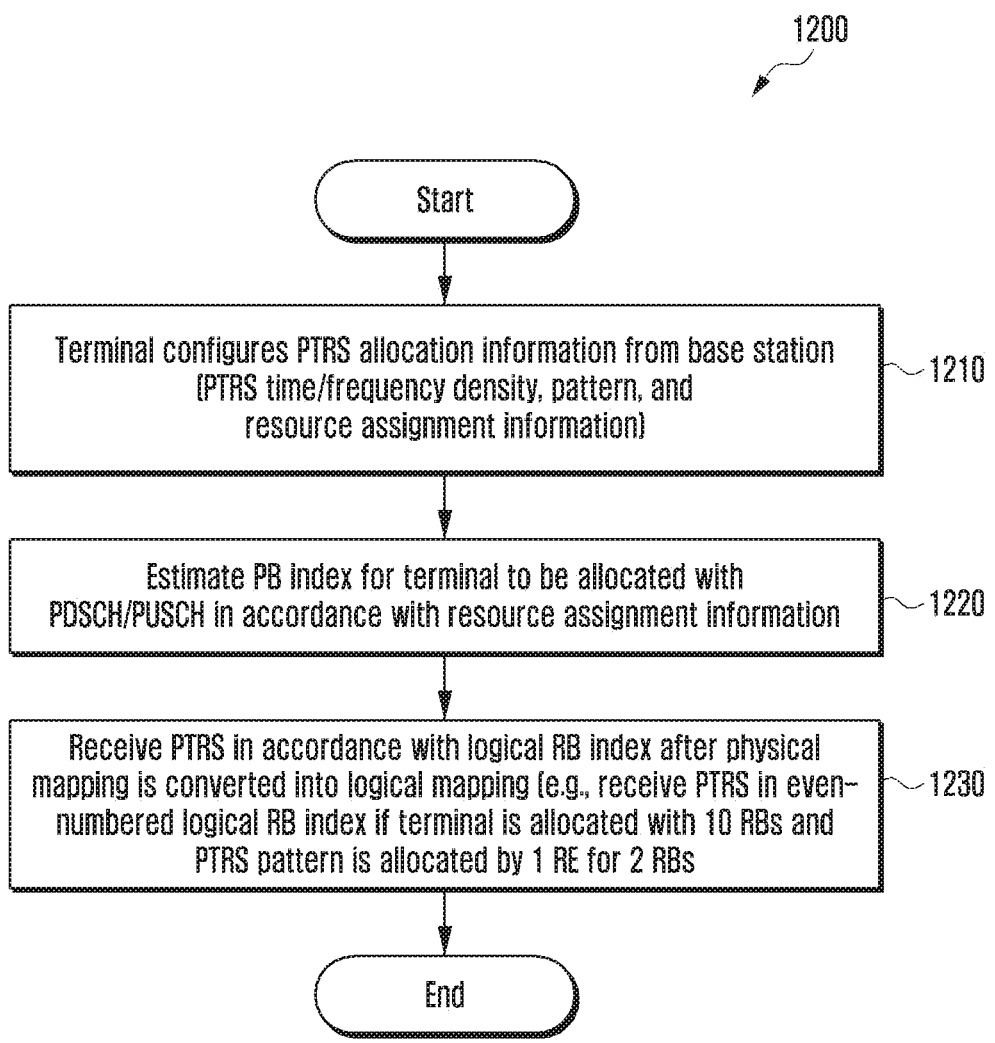
FIG. 12 is a flowchart explaining an operation of a base station to perform PTRS mapping using a logical RB index according to an embodiment of the disclosure.

FIGS. 9 and 10 are flowcharts (900, 1000) explaining the operations of a base station and a terminal for PTRS mapping using a physical RB index according to an embodiment of the disclosure. FIGS. 11 and 12 are flowcharts explaining the operations of a base station and a terminal for PTRS mapping using a logical RB index according to an embodiment of the disclosure.

Referring to FIGS. 9-12, in consideration of channel selectivity on a frequency axis, the PTRS is allocated to be distributed to heighten estimation performance. One PTRS RE may be allocated for 2 resource blocks (RBs) or 4 RBs. In this case, two types of mapping methods may be considered as follows.

First is a method for mapping PTRSs in consideration of a physical RB index. That is, that is a method for allocating the PTRSs for 2 RBs or 4 RBs based on the physical RB index. In this case, it is advantageous to allocate the PTRSs at an equal interval, but in consideration of non-consecutive scheduling, PTRS REs may be less allocated, and performance deterioration may occur. FIGS. 9 and 10 are diagrams explaining the operations of the base station and the terminal for PTRS mapping using the physical RB index.

Referring to FIG. 9, the base station configures PTRS allocation information of a specific UE at operation 910 and configures a PRB index for the terminal to be allocated with a physical downlink shared channel (PDSCH)/physical uplink shared channel (PUSCH) at operation 920. The base station may allocate the configured PTRS to the physical RB index to be transmitted to the terminal at operation 930. Referring to FIG. 10, the terminal receives the PTRS allocation information from the base station at operation 1010 and estimates the PRB index for the terminal to be allocated with PDSCH/PUSCH at operation 1020. The terminal may receive the configured PTRSs in accordance with the physical RB index, and may perform phase tracking at operation 1030).

The second method is a method for mapping PTRSs in consideration of a logical RB index. Before being mapped to the physical RB, the logical scheduled RB may be assumed to be consecutively allocated, and thus the PTRS can be allocated at an equal interval based on the logical RB index. In this case, the PTRS density can be always constantly secured.

FIGS. 11 and 12 are diagrams (1100, 1200) explaining the operations of the base station and the terminal in case of mapping the PTRS to a VRB index. The VRB index indicates an index of a virtual RB, and is the same as the logical RB index.

Referring to FIG. 11, the base station configures PTRS allocation information of a specific UE at operation 1110, and configures a PRB index for the terminal to be allocated with PDSCH/PUSCH at operation 1120). Then, the base station may allocate the PTRS to the RB to be transmitted to the terminal in accordance with the logical RB index before performing the physical mapping at operation 1130. The terminal receives the PTRS allocation information from the base station at operation 1210, and estimates the RB index for the terminal to be allocated with PDSCH/PUSCH at operation 1220. After converting the physical mapping into the logical mapping, the terminal may receive the PTRSs in accordance with the logical RB index at operation 1230, and may perform phase tracking at operation 1230.

Figure 13:
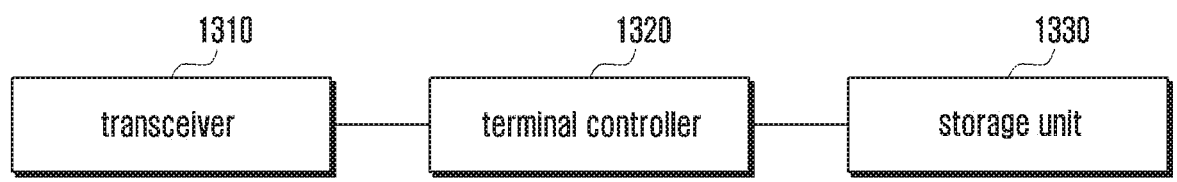
FIG. 13 is a diagram illustrating the structure of a terminal according to an embodiment of the disclosure.

FIG. 13 is a diagram illustrating the structure of a terminal according to an embodiment of the disclosure.

Referring to FIG. 13, a terminal may include a transceiver 1310, a terminal controller 1320, and a storage unit 1330. In the disclosure, the terminal controller 1320 may be defined as a circuit or application-specific integrated circuit or at least one processor.

The transceiver 1310 may transmit/receive signals to/from another network entity. The transceiver 1310 may receive, for example, system information from a base station, and may receive a synchronization signal or a reference signal.

The terminal controller 1320 may control the overall operation of the terminal according to an embodiment proposed in the disclosure. For example, the terminal controller 1320 may control a signal flow between respective blocks to perform operations according to the drawings and flowcharts as described above. The terminal controller 1320 may operate in accordance with the control signal from the base station, and may control the transceiver to send/receive a message or a signal to/from the terminal and/or the base station.

The storage unit 1330 may store at least one of information transmitted/received through the transceiver 1310 and information generated through the terminal controller 1320.

Figure 14:
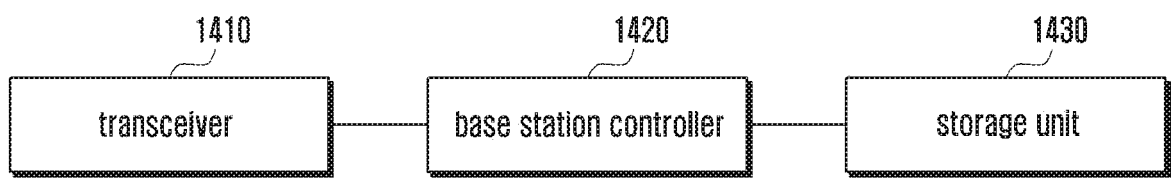
FIG. 14 is a diagram illustrating the structure of a base station according to an embodiment of the disclosure.

FIG. 14 is a diagram illustrating the structure of a base station according to an embodiment of the disclosure.

Referring to FIG. 14, a base station may include a transceiver 1410, a base station controller 1420, and a storage unit 1430. In the disclosure, the base station controller 1420 may be defined as a circuit or application-specific integrated circuit or at least one processor.

The transceiver 1410 may transmit/receive signals to/from another network entity. The transceiver 1410 may transmit, for example, system information to the terminal, and may transmit a synchronization signal or a reference signal.

The base station controller 1420 may control the overall operation of the base station according to an embodiment proposed in the disclosure. For example, the base station controller 1420 may control operations proposed in the disclosure, such as communication with an adjacent base station and allocation of PTRS to a resource for the terminal.

The storage unit 1430 may store at least one of information transmitted/received through the transceiver 1410 and information generated through the base station controller 1420.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal for receiving a downlink (DL) phase tracking reference signal (PTRS) in a wireless communication system, the method comprising:

receiving, from a base station, first information indicating a subcarrier for the DL PTRS and second information indicating a terminal specific sequence identity (ID) for the DL PTRS;

identifying a plurality of resource elements (REs) for the DL PTRS in physical resource blocks (PRBs) allocated for a physical downlink shared channel (PDSCH) transmission based on the information;

receiving the DL PTRS on the plurality of REs, wherein the DL PTRS is mapped to virtual resource blocks (VRBs), and the VRBs are mapped to the PRBs; and performing phase tracking based on the DL PTRS, wherein a sequence for the DL PTRS is generated based on a seed value identified based on the second information.

2. The method of claim 1, wherein the DL PTRS is mapped to the VRBs in a predetermined interval on a frequency axis.

3. The method of claim 1, wherein an antenna port of the DL PTRS corresponds to an antenna port of a demodulation reference signal (DMRS).

4. The method of claim 1, wherein the information further indicates a resource element offset for the DL PTRS.

5. The method of claim 1, wherein the information is received by radio resource control (RRC) signaling.

6. A terminal for receiving a downlink (DL) phase tracking reference signal (PTRS) in a wireless communication system, the terminal comprising:

a transceiver configured to transmit and receive signals; and at least one processor configured to:

receive, from a base station via the transceiver, first information indicating a subcarrier for the DL PTRS and second information indicating a terminal specific sequence identity (ID) for the DL PTRS, identify a plurality of resource elements (REs) for the DL PTRS in physical resource blocks (PRBs) allocated for a physical downlink shared channel (PDSCH) transmission based on the information, receive, from the base station via the transceiver, the DL PTRS on the plurality of REs, wherein the DL PTRS is mapped to virtual resource blocks (VRBs), and the VRBs are mapped to the PRBs, and perform phase tracking based on the DL PTRS, wherein a sequence for the DL PTRS is generated based on a seed value identified based on the second information.

7. The terminal of claim 6, wherein the DL PTRS is mapped to the VRBs in a predetermined interval on a frequency axis.

8. The terminal of claim 6, wherein an antenna port of the DL PTRS corresponds to an antenna port of a demodulation reference signal (DMRS).

9. The terminal of claim 6, wherein the information further indicates a resource element offset for the DL PTRS.

10. The terminal of claim 6, wherein the information is received by radio resource control (RRC) signaling.

11. A method performed by a base station for transmitting a downlink (DL) phase tracking reference signal (PTRS) in a wireless communication system, the method comprising:

transmitting, to a terminal, first information indicating a subcarrier for the DL PTRS and second information indicating a terminal specific sequence identity (ID) for the DL PTRS;

identifying a plurality of resource elements (REs) for the DL PTRS in physical resource blocks (PRBs) allocated for a physical downlink shared channel (PDSCH) transmission based on the information; and transmitting, to the terminal, the DL PTRS for performing phase tracking, the DL PTRS being transmitted on the plurality of REs, wherein the DL PTRS is mapped to virtual resource blocks (VRBs), and the VRBs are mapped to the PRBs, wherein a sequence for the DL PTRS is generated based on a seed value identified based on the second information.

12. The method of claim 11, wherein the DL PTRS is mapped to the VRBs in a predetermined interval on a frequency axis.

13. The method of claim 11, wherein an antenna port of the DL PTRS corresponds to an antenna port of a demodulation reference signal (DMRS).

14. The method of claim 11, wherein the information further indicates a resource element offset for the DL PTRS.

15. The method of claim 11, wherein the information is received by radio resource control (RRC) signaling.

16. A base station for transmitting a downlink (DL) phase tracking reference signal (PTRS) in a wireless communication system, the base station comprising:
a transceiver configured to transmit and receive signals; and
at least one processor configured to:
transmit, to a terminal via the transceiver, first information indicating a subcarrier for the DL PTRS and second information indicating a terminal specific sequence identity (ID) for the DL PTRS,
identify a plurality of resource elements (REs) for the DL PTRS in physical resource blocks (PRBs) allocated for a physical downlink shared channel (PDSCH) transmission based on the information, and
transmit, to the terminal via the transceiver, the DL PTRS for performing phase tracking, the DL PTRS being transmitted on the plurality of REs, wherein the DL PTRS is mapped to virtual resource blocks (VRBs) and the VRBs are mapped to the PRBs,
wherein a sequence for the DL PTRS is generated based on a seed value identified based on the second information.

17. The base station of claim 16, wherein the DL PTRS is mapped to the VRBs in a predetermined interval on a frequency axis.

18. The base station of claim 16, wherein an antenna port of the DL PTRS corresponds to an antenna port of a demodulation reference signal (DMRS).

19. The base station of claim 16, wherein the information further indicates a resource element offset for the DL PTRS.

20. The base station of claim 16, wherein the information is received by radio resource control (RRC) signaling.

* * * * *